(12) United States Patent
Basu et al.

(10) Patent No.: US 10,817,435 B1
(45) Date of Patent: Oct. 27, 2020

(54) QUEUE-BASED WEAR LEVELING OF MEMORY COMPONENTS

(71) Applicant: Micron Technology, Inc., Boise, ID (US)

(72) Inventors: Reshmi Basu, Boise, ID (US); Richard Donald Maes, II, Liberty Lake, WA (US); Katie Blomster Park, Liberty Lake, WA (US); Robert J. Pintar, Spokane, WA (US); Gary A. Johnson, Spokane Valley, WA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/436,079

(22) Filed: Jun. 10, 2019

(51) Int. Cl.
*G06F 12/00* (2006.01)
*G06F 12/123* (2016.01)
*G06F 12/02* (2006.01)
*G06F 12/10* (2016.01)

(52) U.S. Cl.
CPC ........ *G06F 12/123* (2013.01); *G06F 12/0246* (2013.01); *G06F 12/10* (2013.01); *G06F 2212/7201* (2013.01); *G06F 2212/7211* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,282,096 | B1* | 5/2019 | Boyle | G06F 3/0689 |
| 2013/0198439 | A1* | 8/2013 | Kurotsuchi | G06F 12/0246 |
| | | | | 711/103 |
| 2015/0220433 | A1* | 8/2015 | Schmidberger | G06F 12/0253 |
| | | | | 711/103 |
| 2016/0139817 | A1* | 5/2016 | Harijono | G06F 3/0679 |
| | | | | 711/154 |
| 2018/0349645 | A1* | 12/2018 | Helmick | G11B 20/1833 |

* cited by examiner

*Primary Examiner* — John A Lane
(74) *Attorney, Agent, or Firm* — Nicholson De Vos Webster & Elliot LLP

(57) ABSTRACT

A method for wear leveling memory elements in a memory component of a memory subsystem is described. The method includes a memory subsystem receiving a write request that includes user data and a logical address, removing a next physical address from a next address queue, which stores physical addresses that are designated to be used for fulfilling write requests, and writing the user data to the next physical address in the memory component. Further, the memory subsystem locates, in a logical-to-physical table, an entry associated with the logical address of the write request and includes an old physical address that is mapped to the logical address of the write request. The memory subsystem adds the old physical address to a disposal address queue, wherein the disposal address queue stores physical addresses that are not designated to be used for fulfilling write requests.

20 Claims, 11 Drawing Sheets

US 10,817,435 B1

QUEUE-BASED WEAR LEVELING OF MEMORY COMPONENTS

TECHNICAL FIELD

The present disclosure generally relates to wear leveling memory components, and more specifically, relates to using address queues to wear level memory components.

BACKGROUND ART

A memory subsystem can be a storage system, such as a solid-state drive (SSD), or a hard disk drive (HDD). A memory subsystem can be a memory module, such as a dual in-line memory module (DIMM), a small outline DIMM (SO-DIMM), or a non-volatile dual in-line memory module (NVDIMM). A memory subsystem can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
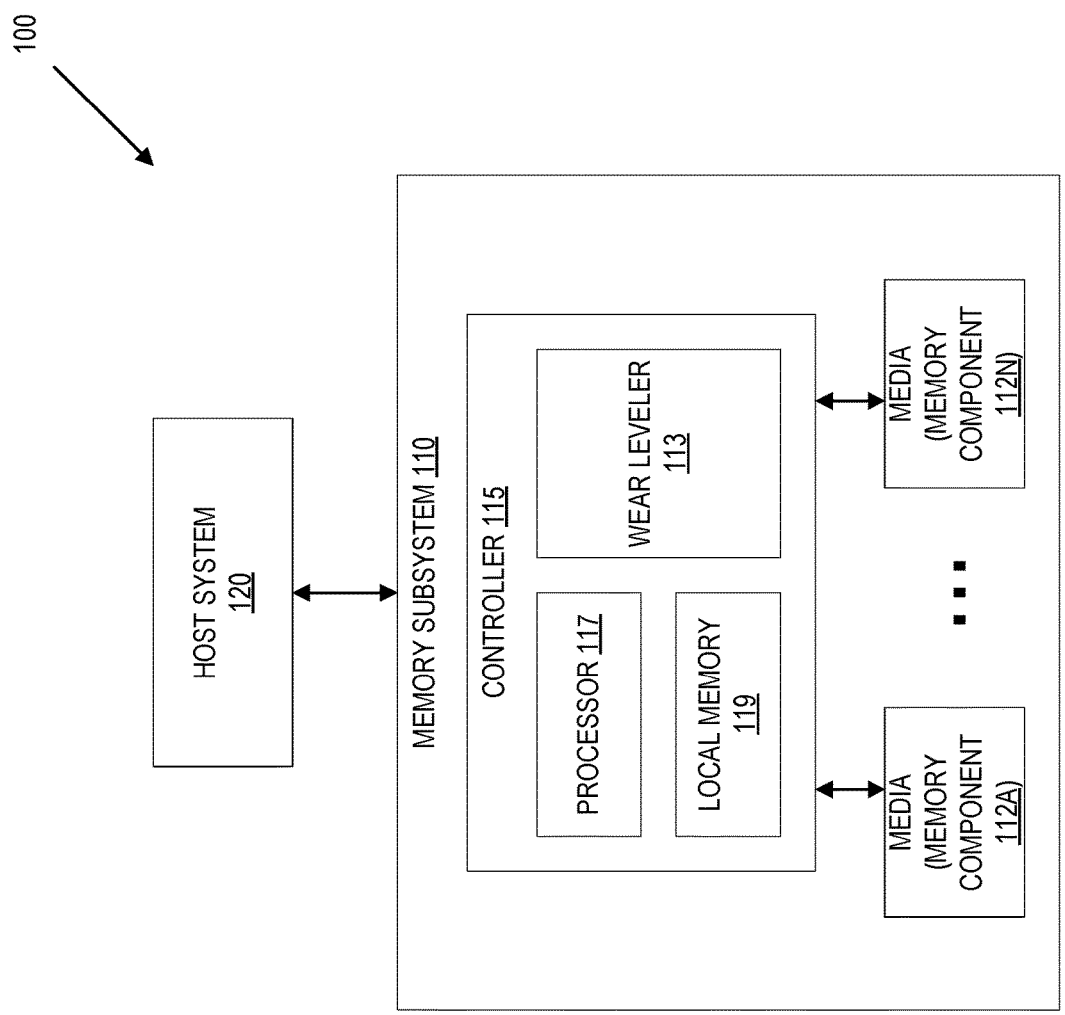
FIG. 1 illustrates an example computing environment that includes a memory subsystem, in accordance with some embodiments of the present disclosure.

Aspects of the present disclosure are directed to using address queues to wear level memory components in a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

A memory component includes a set of memory cells and each memory cell is individually addressable and writeable. Although memory components provide flexibility in allowing a fine granularity for accessing memory cells, each memory cell has a limited number of write cycles before becoming unreliable for data storage. For instance, a memory cell on average could allow for 5,000 write operations before the memory cell becomes unreliable (e.g., writes to the memory cell are unsuccessful or data stored in the memory cell is otherwise lost). Accordingly, based on the limited durability of memory cells, some memory cells can begin to fail before other memory cells in a memory component as a result of a disproportionate number of write operations to the failed memory cells. For example, a first application in a host device could be allocated a first set of memory cells in a memory component while a second application in the host device could be allocated a second set of memory cells in the memory component. In this example, the first application could be very active with many write requests for the first set of memory cells while the second application could be comparatively inactive or idle with a lesser number of write requests in relation to the second of memory cells. Since each memory cell in the first and second set of memory cells have similar durability characteristics (e.g., each memory cell could allow for 5,000 write operations before the memory cell becomes unreliable), the first set of memory cells will likely begin to fail before the second set of memory cells.

To ensure consistent wear across memory cells and, thus, extend the period of time before a memory cell failure in the memory component (e.g., extend the period of time before any single memory cell meets the threshold number of writes before likely failure), wear leveling can be performed across memory cells. Wear leveling prolongs the service life of some kinds of memory components by attempting to spread write operations evenly across memory cells. For example, wear leveling can include tracking the number of operations that impact each memory cell and selecting memory cells for write operations based upon the tracked numbers. Accordingly, wear leveling reduces the chances that any memory cell will fail by limiting a disproportionate number of write operation to any one memory cell. Despite the potential benefits, wear leveling can be resource intensive as it requires considerable amounts of memory and/or computational resources to track write operations across memory cells.

Aspects of the present disclosure address the above and other deficiencies by utilizing a set of low overhead address queues to perform wear leveling of memory cells in a memory subsystem. In particular, the memory subsystem includes a logical-to-physical table, a next address queue, and a disposal address queue. The logical-to-physical table includes entries that map logical addresses (sometimes referred to as virtual addresses), which are used by host systems, to physical addresses of memory cells in a memory component. The next address queue includes physical addresses that are presently designated to be used to fulfill write requests and the disposal address queue includes physical addresses that are presently designated to not be used to fulfill write requests. For example, the memory subsystem receives a write request from a host system to perform a write operation of user data to the logical address LOG_C. In response to receipt of this write request, the memory subsystem retrieves/removes the next physical address from the next address queue and uses this physical address to perform the write operation and consequently fulfill the write request. For example, the next physical address in the next address queue is the physical address PHY_R such that the memory subsystem writes the user data from the received write request to the physical address PHY_R. Although the write operation was performed in relation to the physical address PHY_R, this physical address was not mapped to the logical address LOG_C at the time of receiving the write request. For example, at the time the memory subsystem receives the write request, an entry in the logical-to-physical table maps the logical address LOG_C to the physical address PHY_E. This mapping could be based on a previous write request involving the logical address LOG_C in which the data from the write request was written to the physical address PHY_E. To reflect the new mapping of the logical address LOG_C to the physical address PHY_E, the memory subsystem updates the entry in the logical-to-physical table corresponding to the logical address LOG_C to reference the physical address PHY_R instead of the physical address PHY_E. Further, the memory subsystem adds the previously-used physical address, PHY_E, to the disposal address queue. As noted above, the disposal address queue includes physical addresses that are presently designated to not be used to fulfill write requests. In particular, memory cells associated with the physical addresses in the disposal queue could have recently been subject to a write operation based on their presence in the logical-to-physical table. Through inclusion in the disposal address queue, the memory subsystem ensures that these physical addresses are not subject to a write operation in the immediate future. Instead, as described above, write operations are performed with the physical addresses in the next address queue, as these physical addresses are not present in the logical-to-physical table and thus are not likely to have been involved in a recent write operation.

Upon the memory subsystem detecting that the disposal address queue is filled (i.e., through the addition of physical addresses from the logical-to-physical table to the disposal address queue) or the next address queue is empty (i.e., through the use of physical addresses from the next address queue to fulfill write operations), the memory subsystem swaps addresses between the next address queue and the disposal address queue. Thus, the physical addresses that were previously not used for write operations (i.e., the physical addresses in the disposal address queue) can now be used for write operations (i.e., the physical addresses in the next address queue). In this fashion, physical addresses and corresponding memory cells are evenly cycled between being ineligible for use for write operations and eligible for use with write operations such that wear leveling can be performed between memory cells. Further, the wear leveling technique described herein avoids the overhead involved in monitoring and/or tracking the number of writes to each memory cell by utilizing sets of queues. Accordingly, wear leveling is performed on memory cells to extend the longevity of the memory component with limited impact on resources.

Although described above in relation to memory cells, wear leveling can be performed in relation to any segment/portion of a memory component (e.g., a codeword, a logical block, a managed unit, etc.). Accordingly, the discussion of wear leveling in relation to memory cells is for illustrative purposes.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single-level cells (SLCs) or multi-level cells (MLCs) (e.g., triple-level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes wear leveler 113 that can wear level memory components 112A to 112N in a memory subsystem 110 using a set of address queues. In some embodiments, the controller 115 includes at least a portion of the wear leveler 113. For example, the controller 115 can include a processor 117 (processing device) configured to execute instructions stored in local memory 119 for performing the operations described herein. In some embodiments, the wear leveler 113 is part of the host system 110, an application, or an operating system.

The wear leveler 113 can wear level memory cells in the memory components 112A to 112N using a next address queue, which stores physical addresses of memory cells that are designated for use in fulfilling write requests; a disposal address queue, which stores physical addresses of memory cells that are not designated or are otherwise excluded for use in fulfilling write requests; and a logical-to-physical table that is used to map logical addresses used by hosts systems to physical addresses of memory cells. Further details with regards to the operations of the wear leveler 113 are described below.

Figure 2:
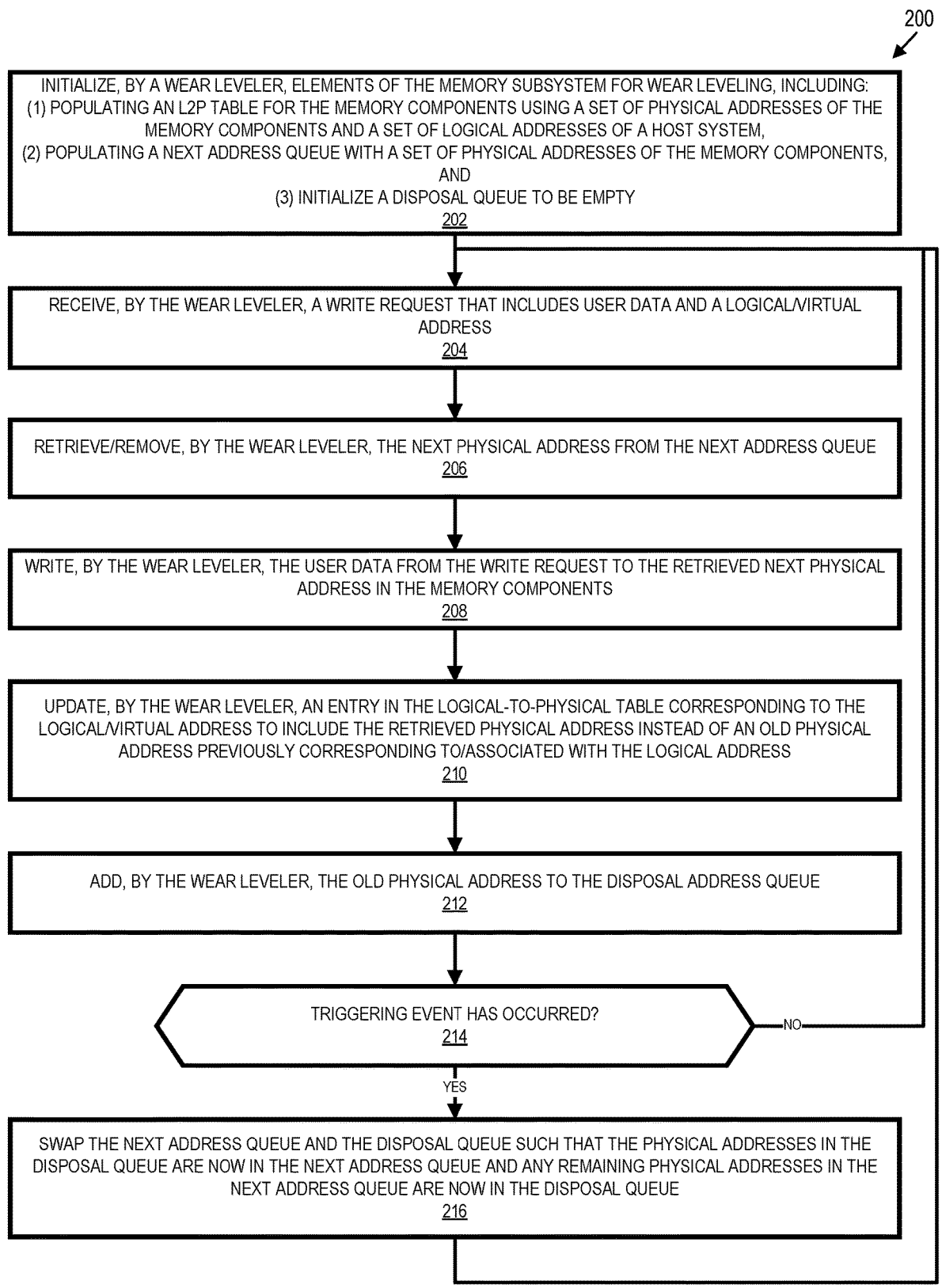
FIG. 2 is a flow diagram of an example method to perform queue-based wear leveling in accordance with some embodiments of the present disclosure.

FIG. 2 is a flow diagram of an example method 200 to perform queue-based wear leveling, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear leveler 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
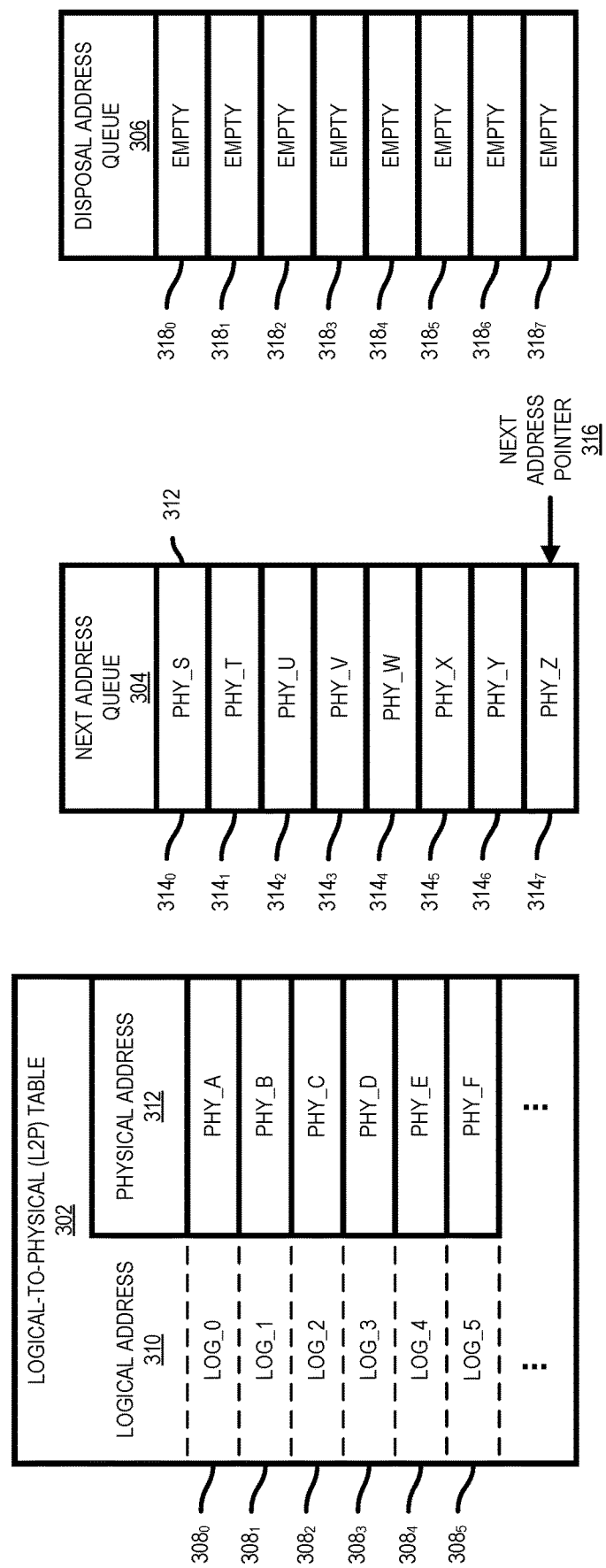
FIG. 3 shows a logical-to-physical table, a next address queue, and a disposal address queue following initialization, in accordance with some embodiments of the present disclosure.

At operation 202, the processing device initializes elements for performing wear leveling of the memory components 112A to 112N. In particular, at operation 202 the processing device can (1) populate a logical-to-physical table (sometimes referred to as an L2P table) for the memory components 112A to 112N using a set of physical addresses of the memory components 112A to 112N and set of logical addresses of the host system 120, (2) populate a next address queue with a set of physical addresses of the memory components 112A to 112N, and (3) initialize a disposal address queue. For example, FIG. 3 shows a logical-to-physical table 302, a next address queue 304, and a disposal address queue 306 following initialization by the processing device at operation 202, according to one example embodiment. As shown in FIG. 3, the logical-to-physical table 302 includes a set of entries $308_0$-$308_5$ and each entry 308 (1) is associated with a logical address 310 that is used by the host system 120 to access the memory components 112A to 112N and (2) includes or otherwise references a physical address 312 of the memory components 112A to 112N. Accordingly, each entry 308 maps an associated logical address 310 to a physical address 312 of the memory components 112A to 112N. As shown in FIG. 3, the entry $308_0$ is associated with the logical address LOG_0 and includes the physical address PHY_A such that the physical address PHY_A is mapped to the logical address LOG_0; the entry $308_1$ is associated with the logical address LOG_1 and includes the physical address PHY_B such that the physical address PHY_B is mapped to the logical address LOG_1; the entry $308_2$ is associated with the logical address LOG_2 and includes the physical address PHY_C such that the physical address PHY_C is mapped to the logical address LOG_2; the entry $308_3$ is associated with the logical address LOG_3 and includes the physical address PHY_D such that the physical address PHY_D is mapped to the logical address LOG_3; etc.

As also shown in FIG. 3, the next address queue 304 includes a set of entries $314_0$-$314_7$ that include physical addresses 312 of the memory components 112A to 112N. In one embodiment, the processing device selects and adds physical addresses 312 to the next address queue 304 based on the availability of the physical addresses 312 and corresponding memory cells. For example, the processing device queries a codeword status table to locate or otherwise determine a set of memory cells and corresponding physical addresses 312 that are free (i.e., not being used to store data). The codeword status table can include fields for describing memory cells in the memory components 112A to 112N, which are represented by separate entries. For example, the codeword status table can include one or more of: (1) a dead field (1 bit), which indicates whether a corresponding memory cell is dead; (2) a free field (1 bit), which indicates whether a corresponding memory cell is free (i.e., whether the memory cell is being used to store data); (3) a VDM field (2 bits), which indicates a read voltage for a corresponding memory cell; (4) a timestamp field (12 bits), which indicates a time of the last read and/or write to a corresponding memory cell; (5) a read disturbance field (13 bits), which indicates a level/degree of disturbance to a corresponding memory cell caused by reads to that memory cell; (6) a write disturbance field (12 bits), which indicates a level/degree of disturbance to a corresponding memory cell caused by writes to adjacent memory cells; (7) a forced write count field (12 bits), which indicates a number of forced writes to a corresponding memory cell; (8) a read count field (23 bits), which indicates a number of writes to a corresponding memory cell; and (9) a write count field (22 bits), which indicates a number of writes to a corresponding memory cell. In one embodiment, the processing device queries the codeword status table at operation 202 to locate or otherwise determine a set of memory cells and corresponding physical addresses 312 that are free (i.e., a free field in entries corresponding to memory cells and physical addresses 312 is set ("1")). The processing device adds entries 314 to the next address queue 304 corresponding to these located free physical addresses 312. As shown in FIG. 3, the entry $314_0$ includes the physical address PHY_S, the entry $314_1$ includes the physical address PHY_T, the entry $314_2$ includes the physical address PHY_U, the entry $314_3$ includes the physical address PHY_V, etc. In some cases, the processing device can determine that the memory components 112A to 112N do not include any free physical addresses 312 (i.e., the memory components 112A to 112N are full). In these cases, the processing device cannot process new write operations until a free physical address 312 is located (e.g., a physical address 312 is deallocated). The processing device maintains a next address pointer 316 (sometimes referred to as a next address reference 316 or a next address cursor 316) relative to the next address queue 304. The next address pointer 316 indicates the next physical address 312 in the next address queue 304 that the processing device will remove and use to perform a write operation. As physical addresses 312 are removed from the next address queue 304 based on the next address pointer 316, the processing device adjusts the next address pointer 316 to point the next entry 314 and corresponding physical address 312 in the next address queue 304. For example, as shown in FIG. 3, the next address pointer 316 can move up to the next entry $314_6$ after the physical address PHY_Z corresponding to the entry $314_7$ is taken/removed from the next address queue 304. Although shown as using a pointer (i.e., the next address pointer 316), the next address queue 304 can be configured/implemented using any data structure, including a stack, such that an ordered set of physical addresses 312 can be cycled through to fulfill write requests.

As also shown in FIG. 3, the disposal address queue 306 includes a set of entries 318. Although during performance of the method 200 the processing device will modify the entries 318 to include physical addresses 312, the processing device initializes entries 318 in the disposal address queue 306 without reference to physical addresses 312. Accordingly, the disposal address queue 306 is initialized empty (i.e., all entries 318 in the disposal address queue 306 do not include physical addresses 312). As will be described in greater detail below, as the method 200 is performed, the physical addresses 312 are removed from the logical-to-physical table 302 and added to entries 318 of the disposal address queue 306.

At operation 204, the processing device receives a write request from a host system 120. The write request includes (1) user data to be written to the memory components 112A to 112N and (2) a logical address 310. The logical address 310 of the write request corresponds to an entry 308 in the logical-to-physical table 302 that is managed by the processing device. For example, when the logical address 310 is the logical address LOG_2, this logical address 310 corresponds to entry $308_2$, which is initially mapped to the physical address PHY_C of the memory components 112A to 112N. As will be described in greater detail below, the processing device will adjust/modify this mapping of the logical address LOG_2 to better ensure wear amongst memory cells in the memory components 112A to 112N is level/consistent.

Figure 4:
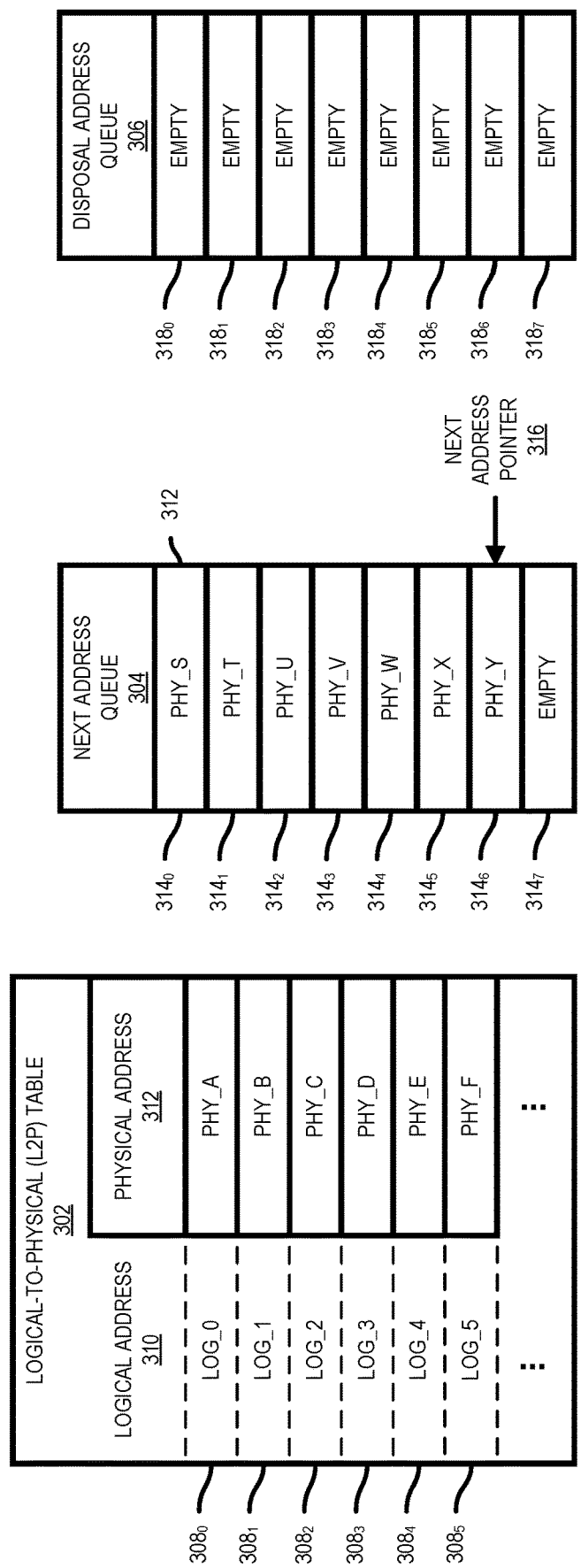
FIG. 4 shows a physical address removed from a next address queue to begin processing of a first write request, in accordance with some embodiments of the present disclosure.

At operation 206, the processing device retrieves/removes the next physical address 312 from the next address queue 304. For example, the processing device can use the next address pointer 316 to locate and retrieve/remove the next physical address 312 from the next address queue 304 at operation 206. In the example embodiment shown in FIG. 3, the next physical address 312 is the physical address PHY_Z, which is referenced by the next address pointer 316. Accordingly, as shown in FIG. 4, the processing device retrieves/removes the physical address PHY_Z at operation 206. Retrieving/removing the physical address PHY_Z causes the processing device to also adjust the next address pointer 316 such that the next address pointer 316 now references the next physical address 312 in the next address queue 304 (e.g., the physical address PHY_Y in the entry $314_6$).

At operation 208, the processing device writes the user data from the received write request to the memory components 112A to 112N using the retrieved/next physical address 312 from operation 206. In the example described above, which is shown in FIG. 3, the retrieved/next physical address 312 is the physical address PHY_Z. Accordingly, the processing device writes the user data from the write request to the physical address PHY_Z in the memory components 112A to 112N at operation 208.

Figure 5:
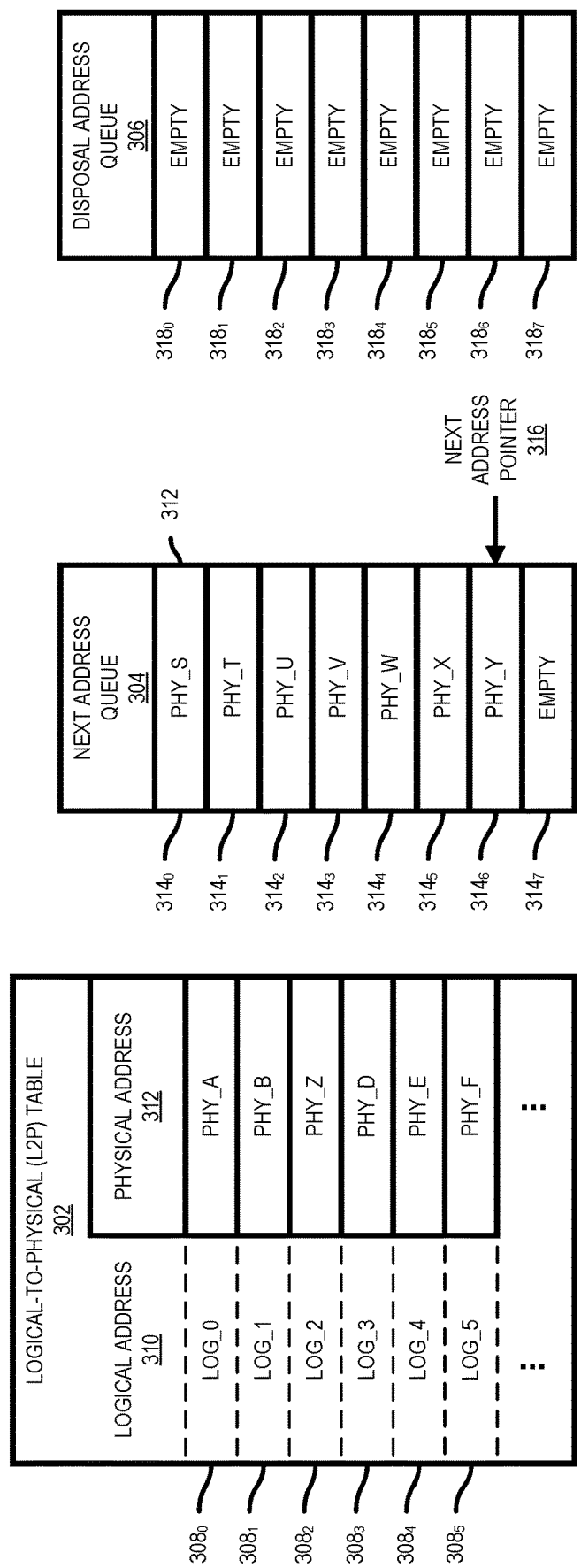
FIG. 5 shows the removed physical address from the next address queue added to the logical-to-physical table, in accordance with some embodiments of the present disclosure.

At operation 210, the processing device updates an entry 308 in the logical-to-physical table 302 corresponding to the logical address of the write request to include the retrieved/next physical address 312 from the next address queue 304 instead of an old physical address that previously was associated with the logical address 310. In the example described above, the logical address 310 in the write request is the logical address LOG_2, which corresponds to the entry $308_2$. Accordingly, as shown in FIG. 5, the entry $308_2$ in the logical-to-physical table 302 corresponding to the logical address LOG_2 is updated to replace the old physical address PHY_C with the retrieved/next physical address PHY_Z.

Figure 6:
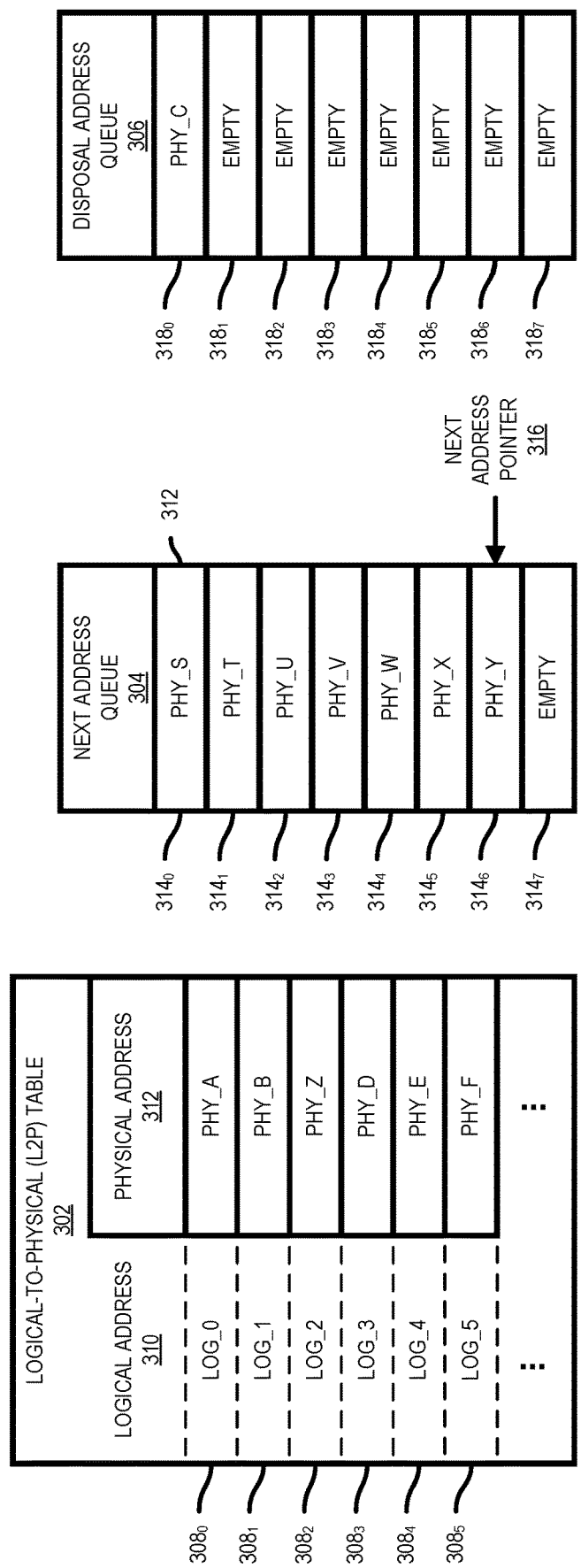
FIG. 6 shows a physical address from the logical-to-physical tables added to the disposal address queue, in accordance with some embodiments of the present disclosure.

At operation 212, the processing device adds the old physical address 312, which was replaced/overwritten in the logical-to-physical table 302 at operation 210, to the disposal address queue 306. In the example described above, the physical address PHY_C was replaced in entry $308_2$ of the logical-to-physical table 302 by the physical address PHY_Z. Accordingly, the processing device adds the physical address PHY_C to the next free/empty an entry 318 of the disposal address queue 306 at operation 212. As shown in FIG. 6, since the disposal address queue 306 was empty prior to receipt of the write request at operation 204, the processing device modifies the entry $318_0$ to include the physical address PHY_C at operation 212. In one embodiment, the processing device tracks the next free entry 318 of the disposal address queue 306 using a pointer (not illustrated) similar to the next address pointer 316 for next address queue 304.

At operation 214, the processing device determines if a triggering event has occurred (sometimes referred to as a swap triggering event). For example, the triggering event can be the disposal address queue 306 being full. In particular, the processing device determines if each entry 318 in the disposal address queue 306 includes respective physical addresses 312. For example, FIG. 6 shows the logical-to-physical table 302, the next address queue 304, and the disposal address queue 306 following a single write request and corresponding write operation. As shown, the disposal address queue 306 is not full because the entries $318_1$-$318_7$ are empty. In another example, the triggering event can alternatively or additionally be the next address queue 304 being empty (e.g., each of the entries $314_0$-$314_7$ are empty by failing to reference a physical address 312).

Figure 7:
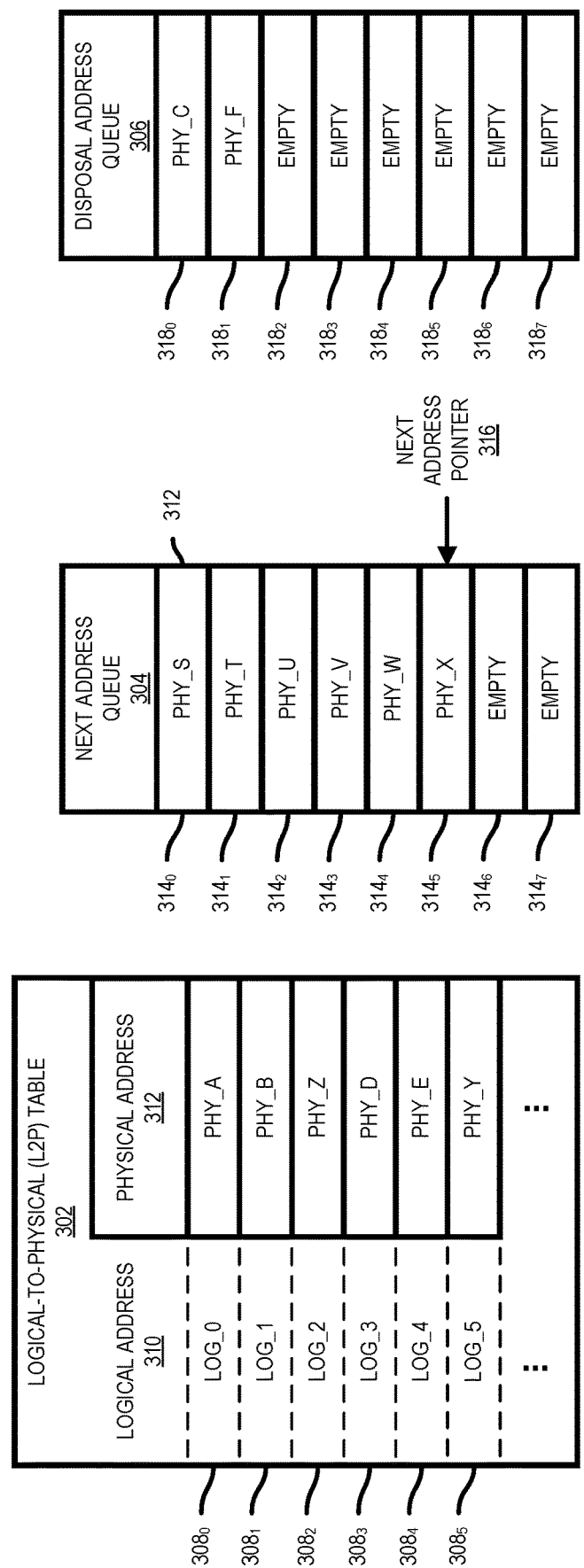
FIG. 7 shows the logical-to-physical table, the next address queue, and the disposal address queue following fulfillment of a second write request, in accordance with some embodiments of the present disclosure.

Upon the processing device determining at operation 214 that a triggering event has not occurred (e.g., the disposal address queue 306 is not full (i.e., one or more entries 318 in the disposal address queue 306 do not include a physical address 312)), the method 200 returns to operation 204 to receive another write request. Accordingly, the processing device performs the operations 204-214 until the processing device determines at operation 214 that a triggering event has occurred. For example, FIG. 7 shows the logical-to-physical table 302, the next address queue 304, and the disposal address queue 306 after the processing device receives and processes a write request involving the logical address LOG_5. As shown, the processing device (1) removed the next physical address PHY_Y from the next address queue 304, which was referenced by the next address pointer 316, and modified the next address pointer 316 to reference the next entry $314_5$ and corresponding physical address 312 in the next address queue 304 at operation 206; (2) used the physical address PHY_Y to perform a write operation to fulfill the recently received write request at operation 208; (3) modified the entry $308_5$ in the logical-to-physical table 302 corresponding to the logical address LOG_5 to include the physical address PHY_Y at operation 210; and (4) added the physical address PHY_F, which was previously referenced by the entry $308_5$ in the logical-to-physical table 302 to the next empty entry 318 of the disposal address queue 306 (i.e., the entry $318_1$ of the disposal address queue 306) at operation 212. When triggering events monitored by the processing device includes one or more of (1) the disposal address queue 306 being full and (2) the next address queue 304 being empty, based on this new write request, the processing device determines at operation 214 that a triggering event has not occurred as the disposal address queue 306 is not full and the next address queue 304 is not empty.

Figure 8:
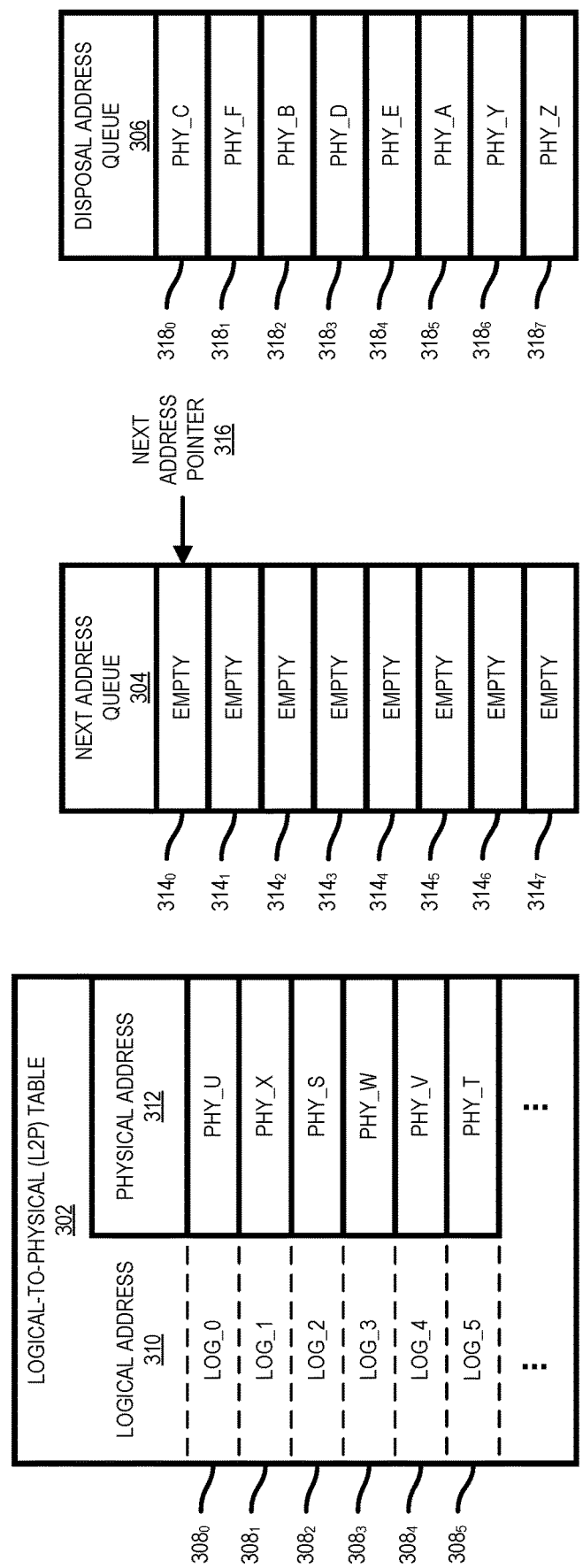
FIG. 8 shows the logical-to-physical table, the next address queue, and the disposal address queue following fulfillment of eight write requests, in accordance with some embodiments of the present disclosure.
Figure 9:
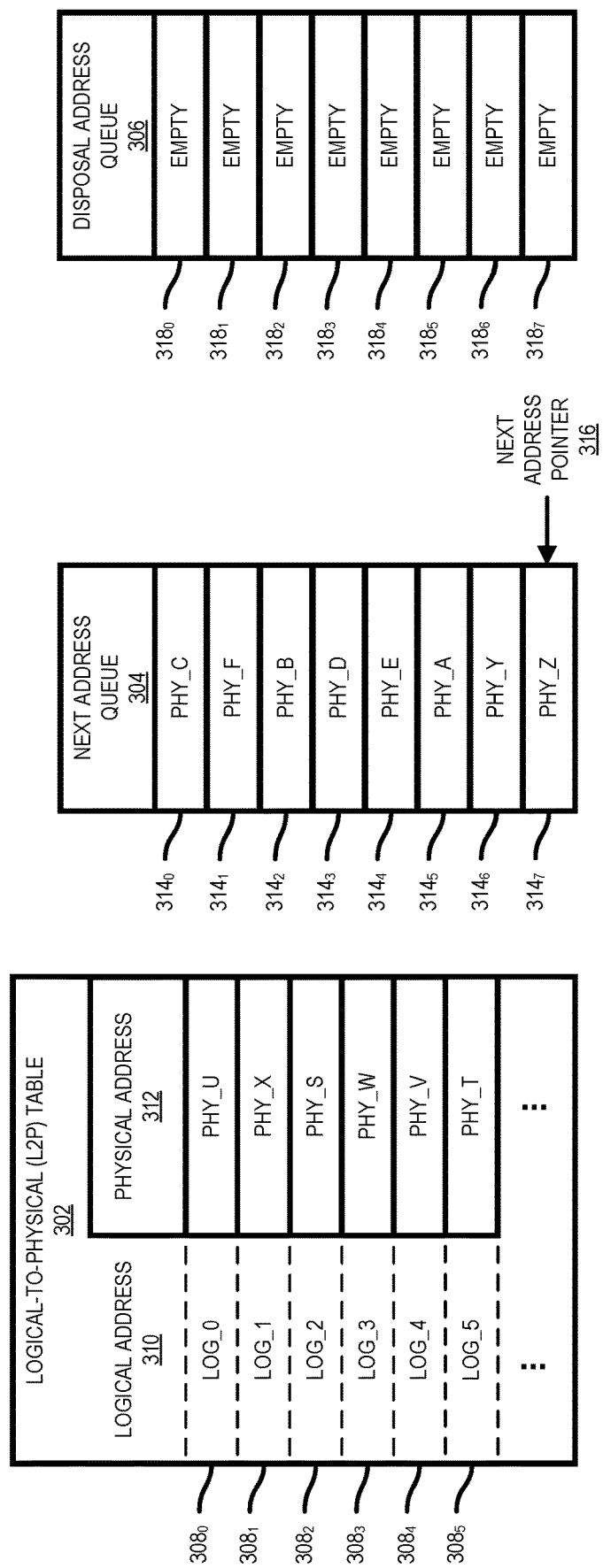
FIG. 9 shows the transfer of physical addresses from the disposal address queue to the next address queue, in accordance with some embodiments of the present disclosure.

FIG. 8 shows the logical-to-physical table 302, the next address queue 304, and the disposal address queue 306 after the processing device receives and processes additional write requests. As shown, each entry 318 of the disposal address queue 306 is now full (i.e., references a physical address 312) such that the processing device determines at operation 214 that a triggering event has occurred. Upon the processing device determining at operation 214 that a triggering event has occurred, the method 200 moves to operation 216. At operation 216, the processing device swaps the entries 314 with corresponding physical addresses 312 in the next address queue 304 and entries 318 with corresponding physical addresses 312 in the disposal address queue 306. In particular, the physical addresses 312 included in entries 318 of the disposal address queue 306 are transferred to entries 314 of the next address queue 304. For example, FIG. 9 shows the example embodiment of FIG. 8 after the processing devices swaps entries 314/318 and corresponding physical addresses 312 between the next address queue 304 and the disposal address queue 306. Accordingly, the physical addresses 312 that were previously designated to not be used for write operations based on their inclusion in the disposal address queue 306 are now designated to be used for write operations based on their inclusion in the next address queue 304. In this fashion, physical addresses 312 are evenly cycled for use with write operations with minimal overhead (i.e., minimum use of memory and computational resources).

Although the next address queue 304 and the disposal address queue 306 are shown as being identical in size/length (i.e., each with eight entries 314/318), the next address queue 304 and the disposal address queue 306 can have different numbers of entries 314/318. In this embodiment, when the disposal address queue 306 has more filled entries 318 than empty entries 314 in the next address queue 304 (e.g., the next address queue 304 has eight empty entries 314 but the disposal address queue 306 has nine filled entries 318), the processing device can transfer only as many entries 318 and corresponding physical addresses 312 from the disposal address queue 306 as will fit in empty entries 314 of the next address queue 304. Non-transferred entries 318 can remain in the disposal address queue 306 for a potential future swap. Similarly, when the next address queue 304 has more empty entries 314 than filled entries 318 in the disposal address queue 306 (e.g., the disposal address queue 306 has eight filled entries 314 but the next address queue 304 has nine empty entries 314), the processing device transfers all entries 318 and corresponding physical addresses 312 from the disposal address queue 306 into empty entries 314 of the next address queue 304, which will leave one or more empty entries 314 in the next address queue 304. Moreover, in some cases, the disposal address queue 306 can be filled but the next address queue 304 maintains one or more filled entries 314. In these cases, the processing device can move the filled entries 314 and corresponding physical addresses 312 to the disposal address queue 306, allow these filled entries 314 and corresponding physical addresses 312 to remain in the next address queue 304, or overwrite the filled entries 314 such that the corresponding physical addresses 312 are not present in either the next address queue 304 or the disposal address queue 306.

In some embodiments, the processing device can utilize multiple next address queues and/or multiple disposal address queues for performing wear leveling. For example, the processing device could select the next address queue 304 from a plurality of next address queues that are designated for performing wear leveling for the memory components 112A to 112N. Similarly, the processing device could select the disposal address queue 306 from a plurality of disposal address queues that are designated for performing wear leveling for the memory components 112A to 112N.

As described above, through the use of a set of address queues/tables (e.g., the logical-to-physical table 302, the next address queue 304, and the disposal address queue 306), the wear leveler 113 can wear level memory cells in the memory components 112A to 112N with minimal overhead (i.e., minimum use of memory and computational resources). Namely, the memory subsystem 110 can efficiently wear level memory cells without needing to track detailed statistics for each memory cell by using the next address queue 304 and the disposal address queue 306 as described above.

Figure 10:
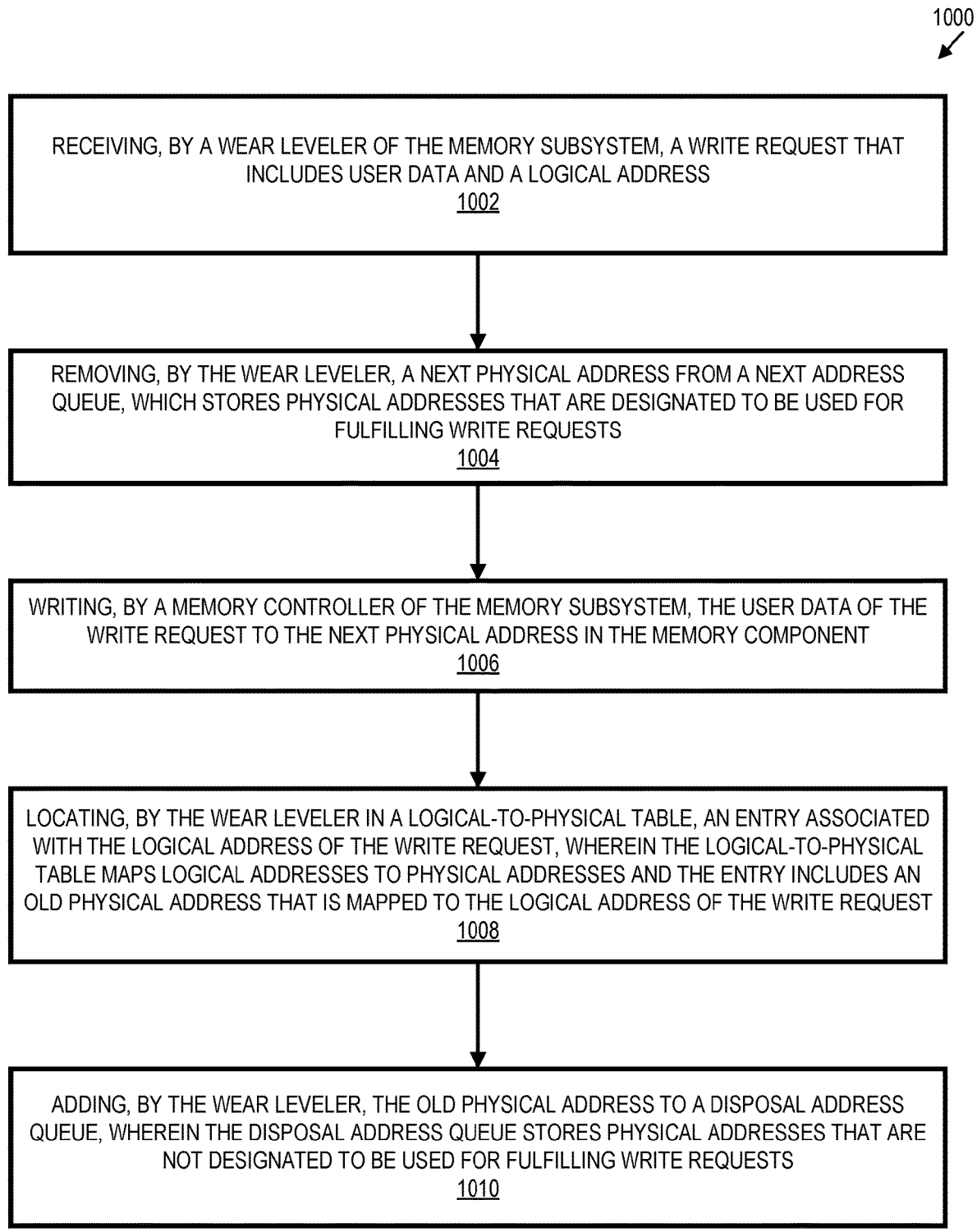
FIG. 10 is a flow diagram of an example method to perform queue-based wear leveling in accordance with some embodiments of the present disclosure.

FIG. 10 is a flow diagram of an example method 1100 to perform queue-based wear leveling, in accordance with some embodiments of the present disclosure. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the wear leveler 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1002, the processing device receives a write request that includes user data and a logical address 310. The write request can be received from the host system 120 or may be internally generated by the memory subsystem 110. Further, the logical address 310 of the write request corresponds to an entry 308 in the logical-to-physical table 302 that is managed by the processing device.

At operation 1004, the processing device removes a next physical address 312 from the next address queue 304, which stores physical addresses 312 that are designated to be used for fulfilling write requests. For example, the processing device can use the next address pointer 316 to locate and remove the next physical address 312 from the next address queue 304 at operation 1004.

At operation 1006, the processing device writes the user data of the write request to the next physical address 312 in a memory component 112.

At operation 1008, the processing device locates in the logical-to-physical table 302 an entry 308 associated with the logical address 310 of the write request. The logical-to-physical table 302 maps logical addresses 310 to physical addresses 312 and the entry 308 includes an old physical address 312 that is mapped to the logical address 310 of the write request.

At operation 1010, the processing device adds the old physical address to a disposal address queue 306. As described herein, the disposal address queue 306 stores physical addresses 312 that are not designated to be used for fulfilling write requests.

Figure 11:
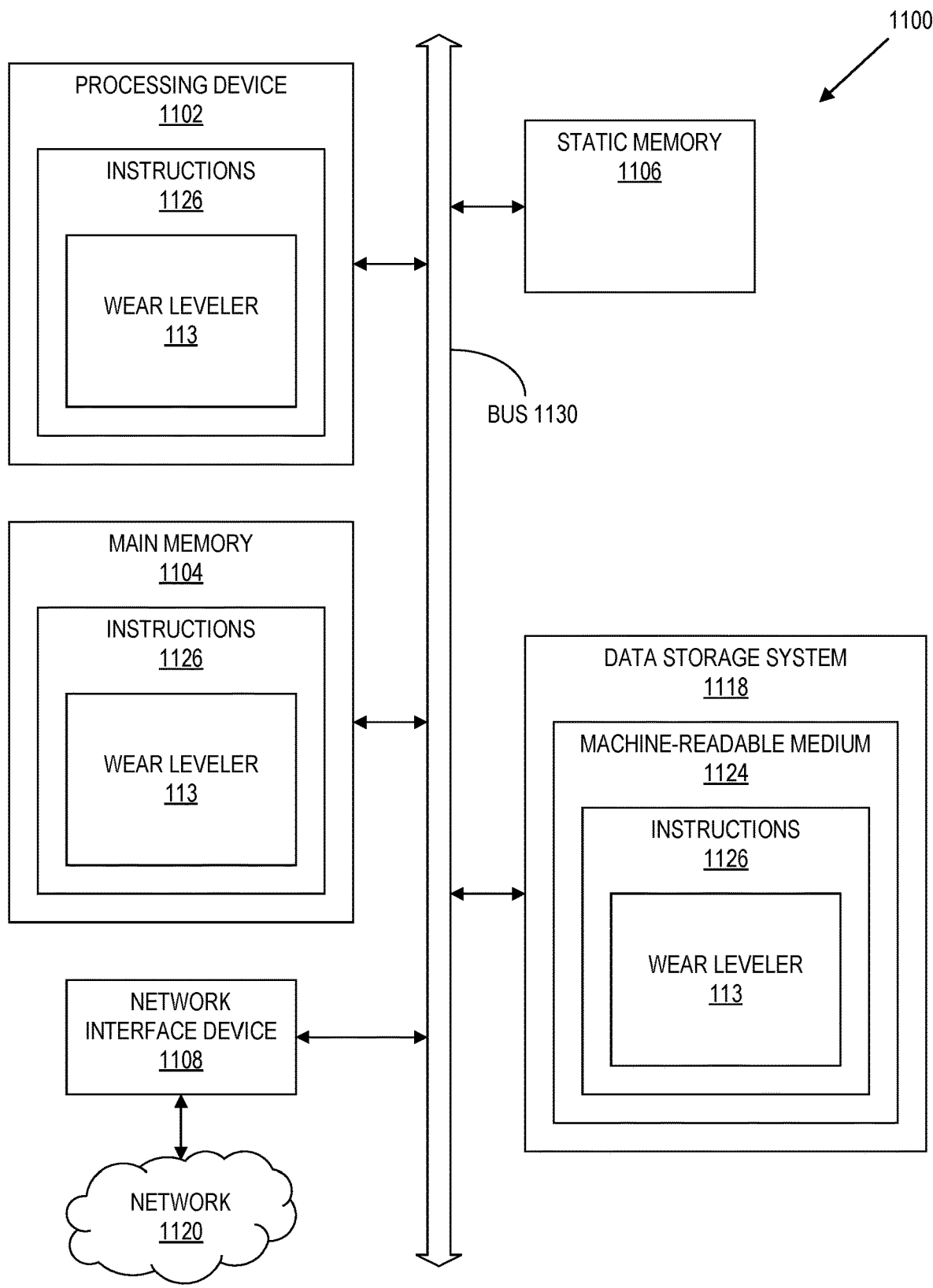
FIG. 11 is a block diagram of an example computer system in which embodiments of the present disclosure may operate.

FIG. 11 illustrates an example machine of a computer system 1100 within which a set of instructions, for causing the machine to perform any one or more of the methodologies discussed herein, can be executed. In some embodiments, the computer system 1100 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the wear leveler 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein. The computer system 1100 can further include a network interface device 1108 to communicate over the network 1120.

The data storage system 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage system 1118, and/or main memory 1104 can correspond to the memory subsystem 110 of FIG. 1.

In one embodiment, the instructions 1126 include instructions to implement functionality corresponding to a wear leveler (e.g., the wear leveler 113 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for wear leveling memory elements in a memory component of a memory subsystem, the method comprising:

receiving, by a wear leveler of the memory subsystem, a write request that includes user data and a logical address;

removing, by the wear leveler, a next physical address from a next address queue, which stores physical addresses that are designated to be used for fulfilling write requests;

writing, by a memory controller of the memory subsystem, the user data of the write request to the next physical address in the memory component;

locating, by the wear leveler in a logical-to-physical table, an entry associated with the logical address of the write request, wherein the logical-to-physical table maps logical addresses to physical addresses and the entry includes an old physical address that is mapped to the logical address of the write request; and adding, by the wear leveler, the old physical address to a disposal address queue, wherein the disposal address queue stores physical addresses that are not designated to be used for fulfilling write requests.

2. The method of claim 1, further comprising:

replacing, by the wear leveler, the old physical address in the entry of the logical-to-physical table with the next physical address, wherein replacing the old physical address in the entry removes the mapping of the old physical address to the logical address.

3. The method of claim 2, further comprising:

determining, by the wear leveler, whether (1) the disposal address queue is full such that each entry in the disposal address queue includes a physical address or (2) the next address queue is empty such that each entry in the next address queue does not include a physical address.

4. The method of claim 3, further comprising:

transferring, by the wear leveler, the physical addresses from the disposal address queue into the next address queue in response to determining that the disposal address queue is full or the next address queue is empty.

5. The method of claim 1, wherein the next physical address in the next address queue is referenced by a next address pointer, and wherein the next physical address corresponds to one of a codeword, a memory cell, or a logical block in the memory component.

6. The method of claim 5, further comprising:

adjusting, by the wear leveler, the next address pointer to reference another physical address in the next address queue after the next physical address is removed from the next address queue.

7. The method of claim 1, wherein the next address queue is selected from a plurality of next address queues for supporting wear leveling the memory elements in the memory component and the disposal queue is selected from a plurality of disposal address queues for supporting wear leveling the memory elements in the memory component.

8. A system comprising:

a memory component; and a processing device, operatively coupled with the memory component, to:

receive a write request that includes user data and a logical address;

locate an entry in a logical-to-physical table, which maps logical addresses to physical addresses, an entry associated with the logical address of the write request, wherein the entry includes an old physical address that is mapped to the logical address of the write request; and add the old physical address to a disposal address queue, wherein the disposal address queue stores physical addresses that are not designated to be used for fulfilling write requests.

9. The system of claim 8, wherein the processing device is further to:

remove a next physical address from a next address queue, which stores physical addresses that are designated to be used for fulfilling write requests; and perform a write operation to write the user data of the write request to the next physical address.

10. The system of claim 9, wherein the processing device is further to:

locate an entry in a logical-to-physical table associated with the logical address of the write request, wherein the logical-to-physical table maps logical addresses to physical addresses and the entry includes an old physical address that is mapped to the logical address of the write request; and replace the old physical address in the entry with the next physical address.

11. The system of claim 10, wherein the processing device is further to:

determine whether the disposal address queue is full or the next address queue is empty; and transfer the physical addresses from the disposal address queue into the next address queue in response to determining that the disposal address queue is full or the next address queue is empty.

12. The system of claim 8, wherein the next physical address in the next address queue is referenced by a next address pointer, and wherein the processing device is further to:

adjust the next address pointer to reference another physical address in the next address queue after the next physical address is removed from the next address queue.

13. The system of claim 8, wherein the old physical address corresponds to one of a codeword, memory cell, or logical block in the memory component.

14. A non-transitory computer-readable storage medium comprising instructions that, when executed by a processing device, cause the processing device to:

receive a write request that includes user data and a logical address;

remove a next physical address from a next address queue, which stores physical addresses that are designated to be used for fulfilling write requests;

write the user data of the write request to the next physical address in a memory component;

locate, in a logical-to-physical table, an entry associated with the logical address of the write request, wherein the logical-to-physical table maps logical addresses to physical addresses and the entry includes an old physical address that is mapped to the logical address of the write request; and add the old physical address to a disposal address queue, wherein the disposal address queue stores physical addresses that are not designated to be used for fulfilling write requests.

15. The non-transitory computer-readable medium of claim 14, wherein the processing device is further to:

replace the old physical address in the entry of the logical-to-physical table with the next physical address, wherein replacing the old physical address in the entry removes the mapping of the old physical address to the logical address.

16. The non-transitory computer-readable medium of claim 15, wherein the processing device is further to:

determine whether (1) the disposal address queue is full such that each entry in the disposal address queue includes a physical address or (2) the next address queue is empty such that each entry in the next address queue does not include a physical address.

17. The non-transitory computer-readable medium of claim 16, wherein the processing device is further to:
transfer the physical addresses from the disposal address queue into the next address queue in response to determining that the disposal address queue is full or the next address queue is empty.

18. The non-transitory computer-readable medium of claim 14, wherein the next physical address in the next address queue is referenced by a next address pointer, and
wherein the next physical address corresponds to one of a codeword, memory cell, or logical block in the memory component.

19. The non-transitory computer-readable medium of claim 18, wherein the processing device is further to:
adjust the next address pointer to reference another physical address in the next address queue after the next physical address is removed from the next address queue.

20. The non-transitory computer-readable medium of claim 14, wherein the next address queue is selected from a plurality of next address queues for supporting wear leveling the memory elements in the memory component and the disposal queue is selected from a plurality of disposal address queues for supporting wear leveling the memory elements in the memory component.

\* \* \* \* \*